US012748832B1

(12) United States Patent
Narang et al.

(10) Patent No.: US 12,748,832 B1
(45) Date of Patent: Sep. 29, 2026

(54) SCREEN LOCK DURING VIDEO CALL

(71) Applicant: WhatsApp LLC, Menlo Park, CA (US)

(72) Inventors: Neeraj Narang, Sunnyvale, CA (US); Yu-Hsuan Wang, San Jose, CA (US)

(73) Assignee: WhatsApp LLC, Menlo Park, CA (US)

( * ) Notice: Subject to any disclaimer, the term of this patent is extended or adjusted under 35 U.S.C. 154(b) by 304 days.

(21) Appl. No.: 17/993,744

(22) Filed: Nov. 23, 2022

Related U.S. Application Data

(60) Provisional application No. 63/421,038, filed on Oct. 31, 2022.

(51) Int. Cl.
*G06F 21/36* (2013.01)

(52) U.S. Cl.
CPC .................................... *G06F 21/36* (2013.01)

(58) Field of Classification Search
CPC ...................................................... G06F 21/36
USPC ........................................................... 726/18
See application file for complete search history.

(56) References Cited

U.S. PATENT DOCUMENTS 9,626,074 B2 4/2017 Ding
10,311,383 B2 * 6/2019 Holmes .................. G06Q 10/02
10,551,995 B1 * 2/2020 Ho ........................ G06F 3/0486
10,579,175 B2 * 3/2020 Seol ........................ G06F 3/016
10,924,601 B2 2/2021 Chen et al.
2021/0266500 A1 * 8/2021 Taylor .................... G06Q 40/03
2023/0045116 A1 * 2/2023 Pitts ....................... H04N 7/152

FOREIGN PATENT DOCUMENTS

CN 108111693 A 6/2018
WO 2014207553 A2 12/2014

OTHER PUBLICATIONS

"Lock My Touch: Smart Lock of Touch Screen & Keys," 2022, 2 pages, Retrieved from the Internet: URL: https://www.lock-my-touch.xyz/.

* cited by examiner

*Primary Examiner* — Jahangir Kabir
(74) *Attorney, Agent, or Firm* — EVERSHEDS SUTHERLAND (US) LLP

(57) ABSTRACT

A method for locking a touch-screen of a mobile device for a video conference application is provided. The method includes receiving, from a user of a client device, a request to lock a screen in the client device during a video conference call, locking the screen in the client device, in response to the request, and providing a video stream of the video conference to the user in the screen of the client device. A system including a memory storing instructions and one or more processors configured to execute the instructions to perform the above method is also provided.

19 Claims, 9 Drawing Sheets

SCREEN LOCK DURING VIDEO CALL

CROSS-REFERENCE TO RELATED APPLICATIONS

Field

The present disclosure is related and claims priority, under 35 U.S.C. § 119(e) to U.S. Prov. Appln. No. 63/421,038, entitled SCREEN LOCK DURING VIDEO CALL, to Neeraj NARANG et al., on Oct. 31, 2022, the contents of which are incorporated by reference herein in their entirety, for all purposes.

BACKGROUND

Field

The present disclosure relates generally to group chat and video conferencing applications. More specifically, the present disclosure relates to widgets and methods to lock input features on a touch-screen display of a device used for a video conferencing application to avoid unintended inputs.

Related Art

Many computer devices, especially mobile devices, include a lock screen feature to prevent users (or non-authorized users) to perform unintentional or illegal inputs. However, current lock screen features result in the freezing of video displays, and in some cases even audio.

SUMMARY

In a first embodiment, a computer-implemented method, includes receiving, from a user of a client device, a request to lock a screen in the client device during a video conference call, locking the screen in the client device, in response to the request, and providing a video stream of the video conference to the user in the screen of the client device.

In a second embodiment, a computer-implemented method, includes receiving, from a user of a client device, a request to lock a screen in the client device while an application is running in the client device, locking the screen in the client device, in response to the request, and providing a view of the application to the user in the screen of the client device.

In a third embodiment, a system includes a memory storing instructions and one or more processors configured to execute the instructions to cause the system to perform operations. The operations include to receive, from a user of a client device, a request to lock a screen in the client device during a video conference call, to lock the screen in the client device, in response to the request, and to provide a video stream of the video conference to the user in the screen of the client device.

In other embodiments, a non-transitory, computer-readable medium stores instructions which, when executed by one or more processors, cause a computer to perform a method, the method including receiving, from a user of a client device, a request to lock a screen in the client device during a video conference call, locking the screen in the client device, in response to the request, and providing a video stream of the video conference to the user in the screen of the client device.

In yet other embodiments, a system includes a first means to store instructions, and a second means to execute the instructions and to cause the system to execute a method. The method includes receiving, from a user of a client device, a request to lock a screen in the client device during a video conference call, locking the screen in the client device, in response to the request, and providing a video stream of the video conference to the user in the screen of the client device.

These and other embodiments will become apparent to one of ordinary skill in view of the following.

BRIEF DESCRIPTION OF THE DRAWINGS

In the figures, elements having the same or similar reference numerals are related to the same or similar features or attributes, unless explicitly stated otherwise.

DETAILED DESCRIPTION

In the following detailed description, numerous specific details are set forth to provide a full understanding of the present disclosure. It will be apparent, however, to one ordinarily skilled in the art, that the embodiments of the present disclosure may be practiced without some of these specific details. In other instances, well-known structures and techniques have not been shown in detail so as not to obscure the disclosure.

General Overview

Participants of networked video-chats, teleconferences, and group videoconferences in general often find themselves in the need to at least partially lock the screen to avoid unintentional/unauthorized touches. Some examples include holding a video conference while a toddler is around, trying to reach out for the mobile device, and even playing with it. In some embodiments, a user may be in the kitchen trying to follow a cooking/baking demonstration on display in the mobile device and is weary of unintentionally activating a button in the mobile device. In other embodiments, a user may pass around the device to friends and other participants in a group videocall and desires to ensure that nobody has access to any of the chat features (e.g., add a new participant, leave the call, start/stop a recording, and the like). In general, the user desires a lock mechanism that keeps the video/audio working seamlessly, while all other functionalities, buttons, and tabs are frozen (e.g., invisible).

Example System Architecture

Figure 1:
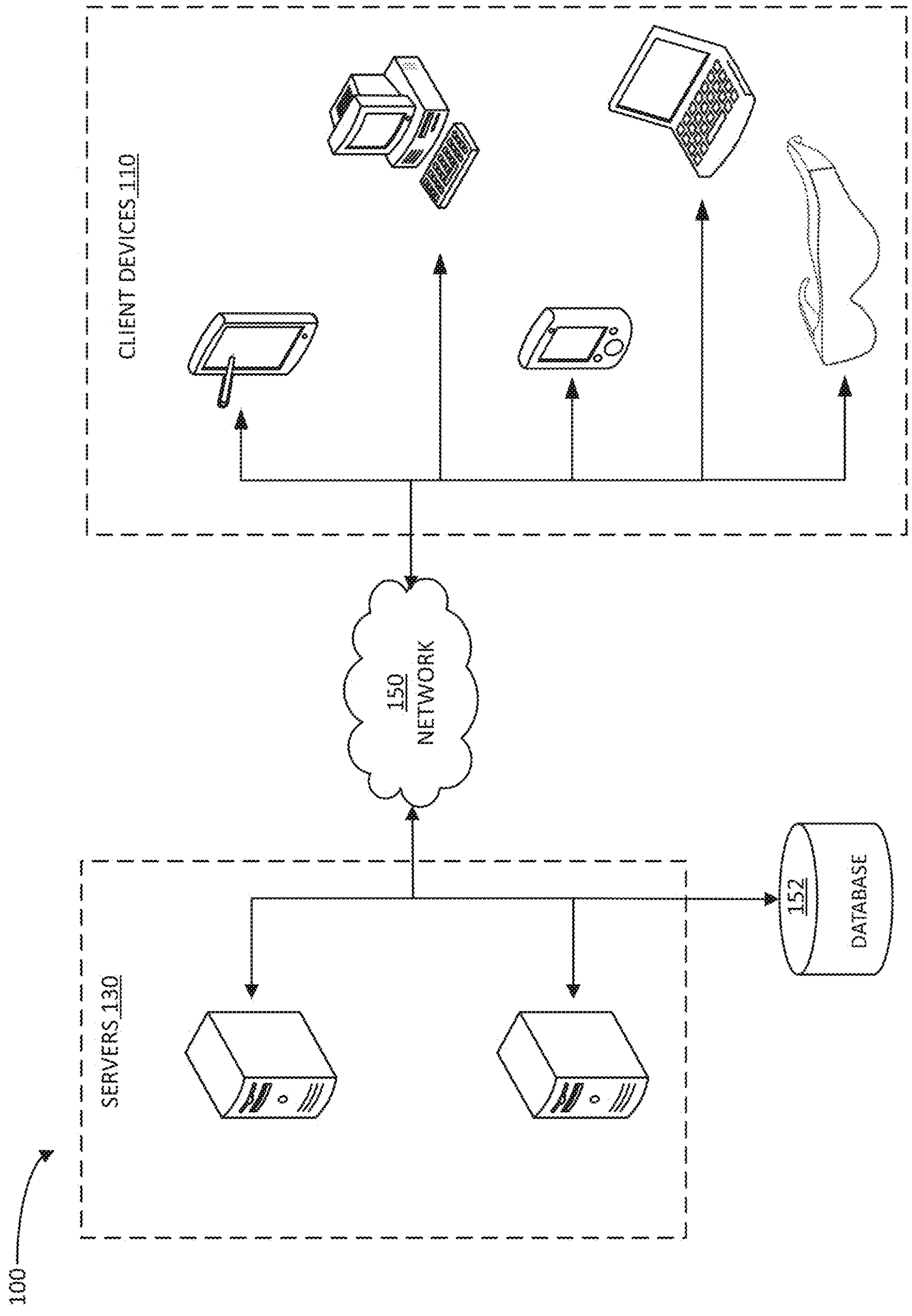
FIG. 1 illustrates a network architecture configured for end-to-end encrypted backup in a messaging application, according to some embodiments.

FIG. 1 illustrates a network architecture 100 configured for locking the screen in a chat application, according to some embodiments. Servers 130 and a database 152 are communicatively coupled with client devices 110 via a network 150. Servers 130 may host chat applications running in client devices 110. Client devices 110 may be used by participants in the chat conversations. Client devices 110 may include smart phones, laptops, mobile devices, palm devices, and even desktops. In some embodiments, client devices 110 may include virtual reality or augmented reality (VR/AR) headsets and/or smart glasses, and the chat conversation may include immersive reality elements. Network 150 can include, for example, any one or more of a local area network (LAN), a wide area network (WAN), the Internet, and the like. Further, network 150 can include, but is not limited to, any one or more of the following network topologies, including a bus network, a star network, a ring network, a mesh network, a star-bus network, tree or hierarchical network, and the like. Database 152 may store backup files from the chat conversations, including threads, messages, videos, and metadata. In addition, database 152 may include encrypted keys that may be distributed to each and all of the chat group participants.

Figure 2:
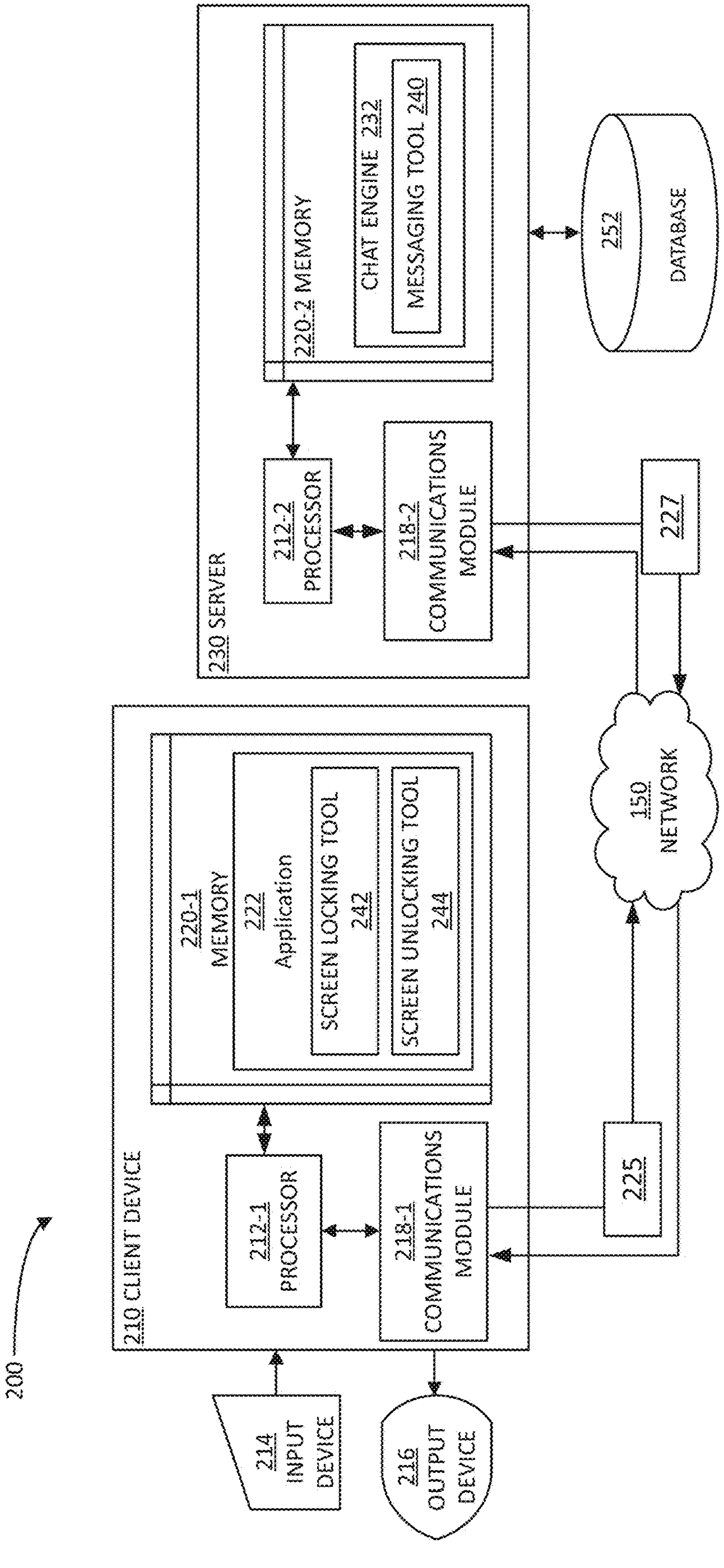
FIG. 2 is a block diagram illustrating details of devices and systems used in the network architecture of FIG. 1, according to some embodiments.

FIG. 2 is a block diagram 200 illustrating an example server 230, client device 210, and database 252 from architecture 100, according to some embodiments. Client device 210 and server 230 are communicatively coupled over network 150 via respective communications modules 218-1 and 218-2 (hereinafter, collectively referred to as "communications modules 218"). Communications modules 218 are configured to interface with network 150 to send and receive information, such as data, requests, responses, and commands to other devices via network 150. Communications modules 218 can be, for example, modems or Ethernet cards, and may include radio hardware and software for wireless communications (e.g., via electromagnetic radiation, such as radiofrequency—RF—, near field communications—NFC—, Wi-Fi, and Bluetooth radio technology). A user may interact with client device 210 via an input device 214 and an output device 216. Input device 214 may include a mouse, a keyboard, a pointer, a touchscreen, a microphone, a joystick, a virtual joystick, and the like. In some embodiments, input device 214 may include cameras, microphones, and sensors, such as touch sensors, acoustic sensors, inertial motion units—IMUs—and other sensors configured to provide input data to a VR/AR headset. Output device 216 may be a screen display, a touchscreen, a speaker, and the like.

Client device 210 may include a memory 220-1 and a processor 212-1. Memory 220-1 may include an application 222 (e.g., a chat application), configured to run in client device 210 and couple with input device 214 and output device 216. Application 222 may be downloaded by the user from server 230 and may be hosted by server 230. In some embodiments, client device 210 is a VR/AR headset and application 222 is an immersive reality application. In some embodiments, client device 210 is a mobile phone used to collect a video or picture and upload to server 230 using a video or image collection application 222, to store in training database 252. In a chat application 222, communications module 218-1 transmits a participant's feed 225 to server 230 for inclusion in a group feed 227. Group feed 227 is transmitted via communications module 218-2 from server 230 to all participants in the chat. Accordingly, participant's feed 225 and group feed 227 may include one or more video payloads.

Chat application 222 may include a screen locking tool 242 and a screen unlocking tool 244. Screen locking tool 242 may be configured to lock a screen 216 in client device 210 during a conversation or conference hosted by group chat application 222. Screen locking tool 242 may allow a video feed 227 to be displayed, but lock all other input gadgets on screen 216. Screen unlocking tool 244 may be available to the user of client device 210 once screen locking tool 242 is activated. In some embodiments, screen unlocking tool 244 displays a puzzle for the user, to ensure that the user of client device 210 consciously unlocks the screen.

Server 230 includes a memory 220-2, a processor 212-2, and communications module 218-2. Hereinafter, processors 212-1 and 212-2, and memories 220-1 and 220-2, will be collectively referred to, respectively, as "processors 212" and "memories 220." Processors 212 are configured to execute instructions stored in memories 220. In some embodiments, memory 220-2 includes a chat engine 232 having a messaging tool 240 configured to receive a participant's feed, synchronizing them, and preparing group feed 227. Chat engine 232 may share or provide group feed 227 to multiple participants in a group chat, after synchronizing multiple participant's feeds 225. Participants in the chat may access chat engine 232 through application 222, installed in memory 220-1. Accordingly, application 222 may be installed by server 230 and perform scripts and other routines provided by server 230 through any one of multiple tools. Execution of application 222 may be controlled by processor 212-1. In some embodiments, chat engine 232, the tools contained therein, and at least part of training database 252 may be hosted in a different server that is accessible by server 230 or client device 210.

Figure 3:
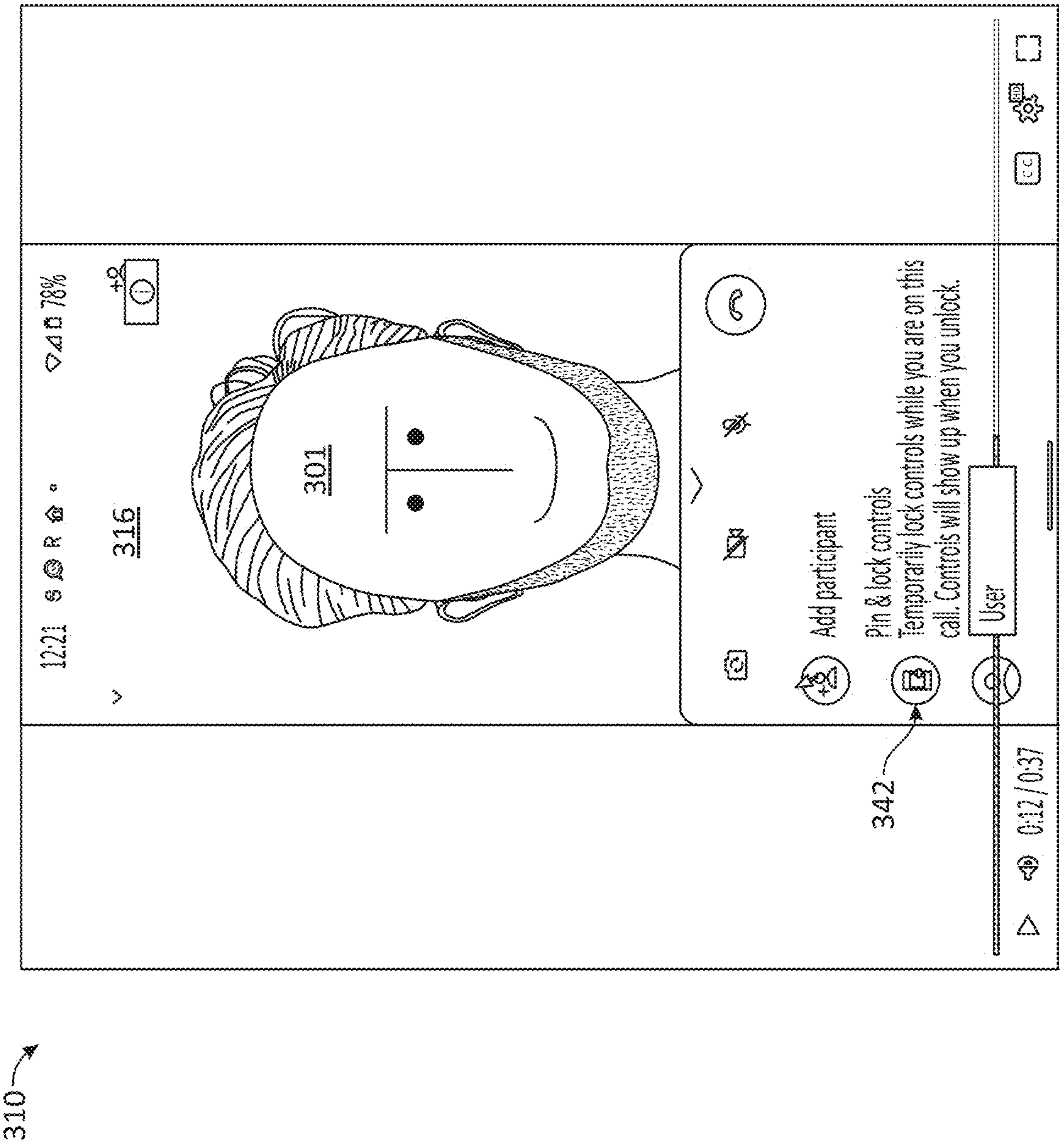
FIG. 3 illustrates a screenshot of a mobile device in a group video call, according to some embodiments.

FIG. 3 illustrates a screenshot 316 of a mobile device 310 in a group video call, according to some embodiments. A user 301 opens the video call menu, and a lock screen control 342 is available for selection. Simply by pressing on the lock screen control 342 will place the touch-screen 316 of mobile device 310 into a lock mode, as disclosed herein. In some embodiments, instead of lock screen control 342, the option may have different levels of action: lock the entire device, lock only the touch-screen, but leave the volume button available, or the on/off button available.

Figure 4:
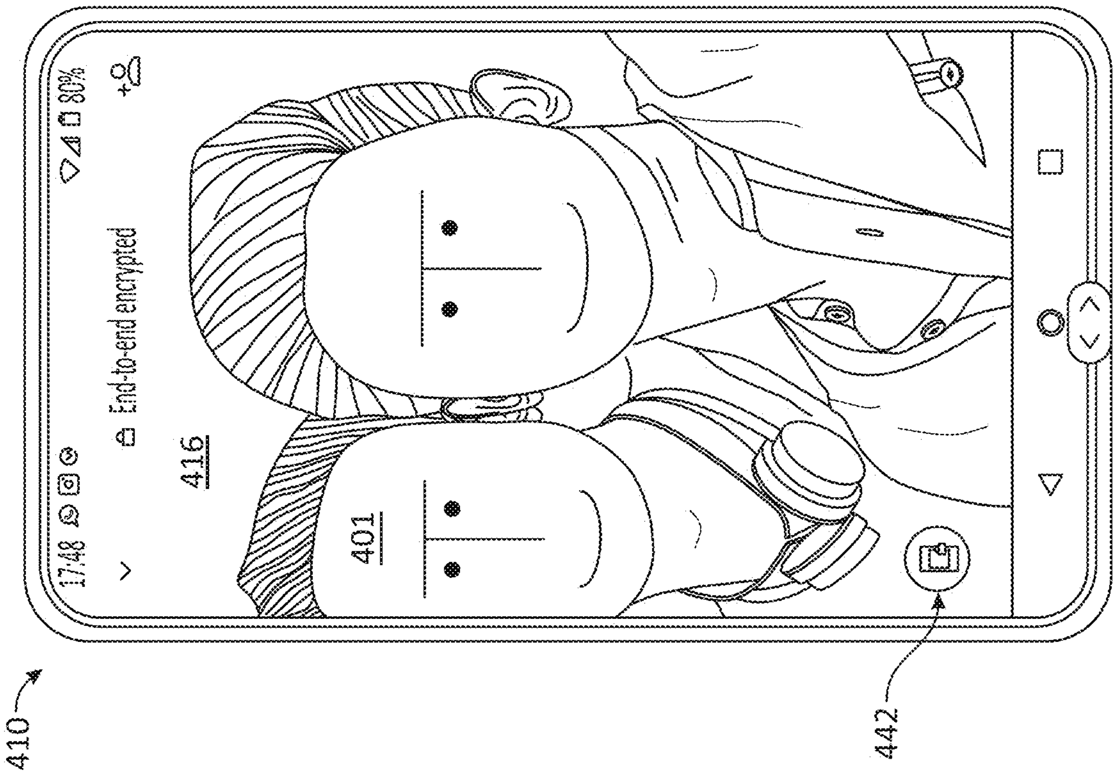
FIG. 4 illustrates a screenshot of a mobile device in a group video call with a locked screen feature selected, according to some embodiments.

FIG. 4 illustrates a screenshot 416 of a mobile device 410 in a group video call with a locked screen feature 442 selected, according to some embodiments. Even though the lock screen button 442 has been selected, the video conference is still playing on the screen. Moreover, in some embodiments, lock screen feature 442 is available to any user of the videoconference application, regardless of any personal settings or preferences. Accordingly, a user 401 that finds themselves in a social situation surrounded by friends, relatives, or other audience members of the video call, may easily hand device 410 to anyone else in the audience by activating lock screen button 442 without the need to log out of their account and log into a different account having more limited settings. User 401 may then pass mobile device 410 around without fearing the call to be disconnected. This enables a more fluid social environment during a video call with family, friends, or colleagues.

Figure 5:
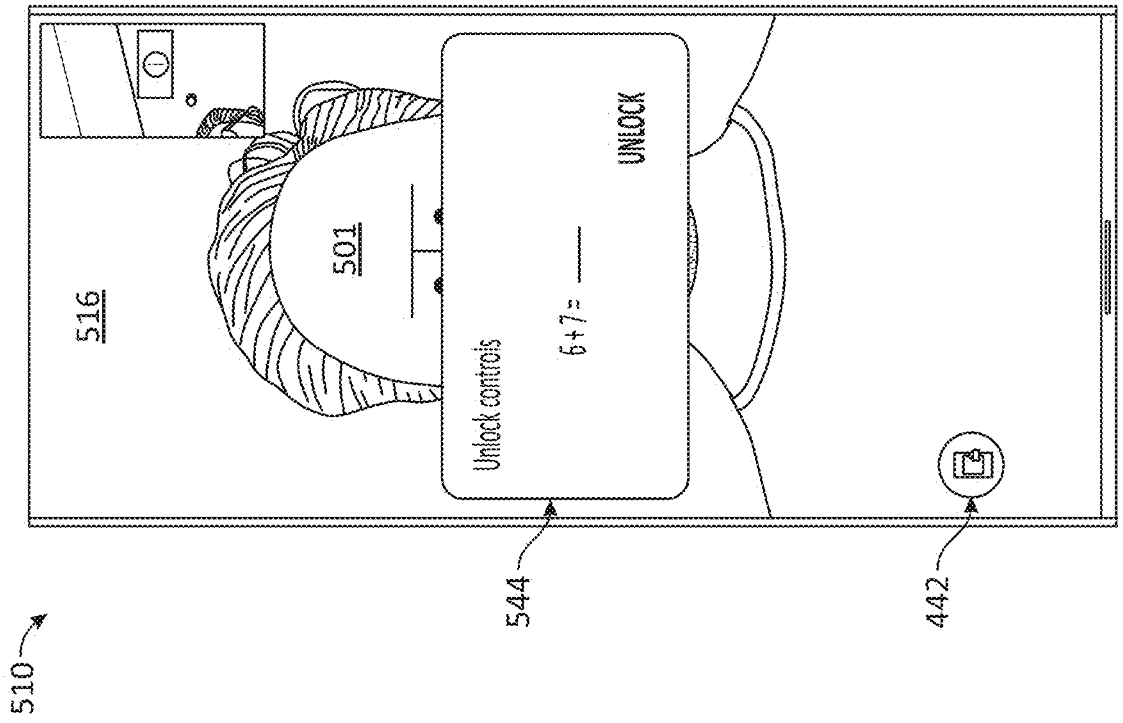
FIG. 5 illustrates a screenshot of a mobile device in a group video call wherein the screen has been locked by the user (cf. the lock screen icon), according to some embodiments.

FIG. 5 illustrates a screenshot 516 of a mobile device 510 in a group video call wherein the screen has been locked by the user 501 (cf. the lock screen icon), according to some embodiments. To unlock the screen and return to the previous configuration of client device 510 and accessories, user 501 may simply tap on lock screen icon 442 again. Upon hitting lock screen icon 442, a simple mathematical puzzle 544 is displayed so that the user can quickly and simply unlock touch-screen 516 when a correct solution to puzzle 544 is provided.

Figure 6:
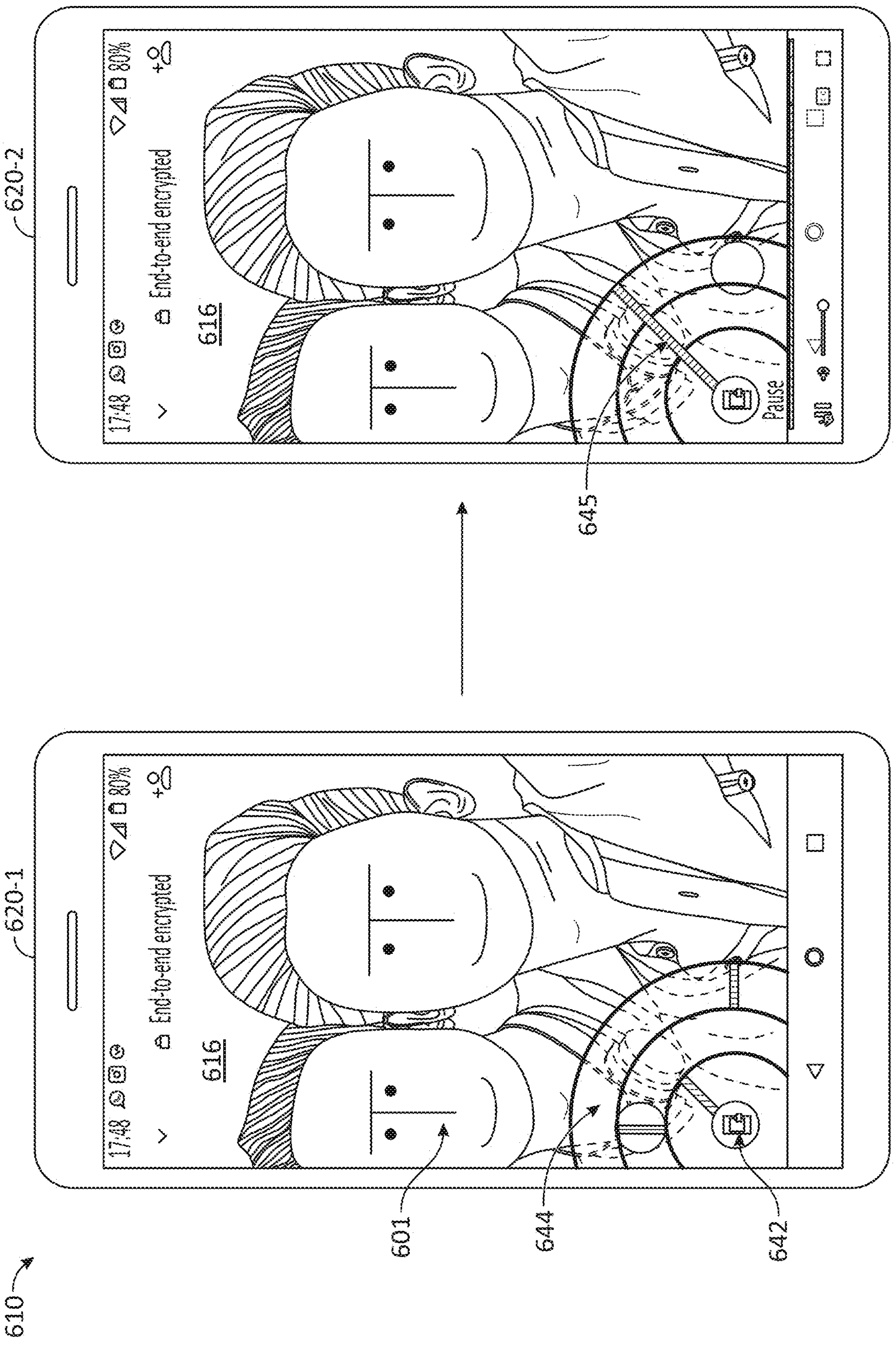
FIG. 6 illustrates a screenshot of a mobile device in a group video call wherein the screen has been locked by the user (cf. the lock screen icon), according to some embodiments.

FIG. 6 illustrates a screenshot 616 of a mobile device 610 in a group video call wherein the screen has been locked by user 601 (cf. lock screen icon 642), according to some embodiments. A simple alignment puzzle 644 is displayed so that user 601 can quickly and simply unlock the touch-screen 616. The transition from lock state 620-1 to unlocked state 620-2 is operated once puzzle 644 is solved with an alignment bar 645.

Figure 7:
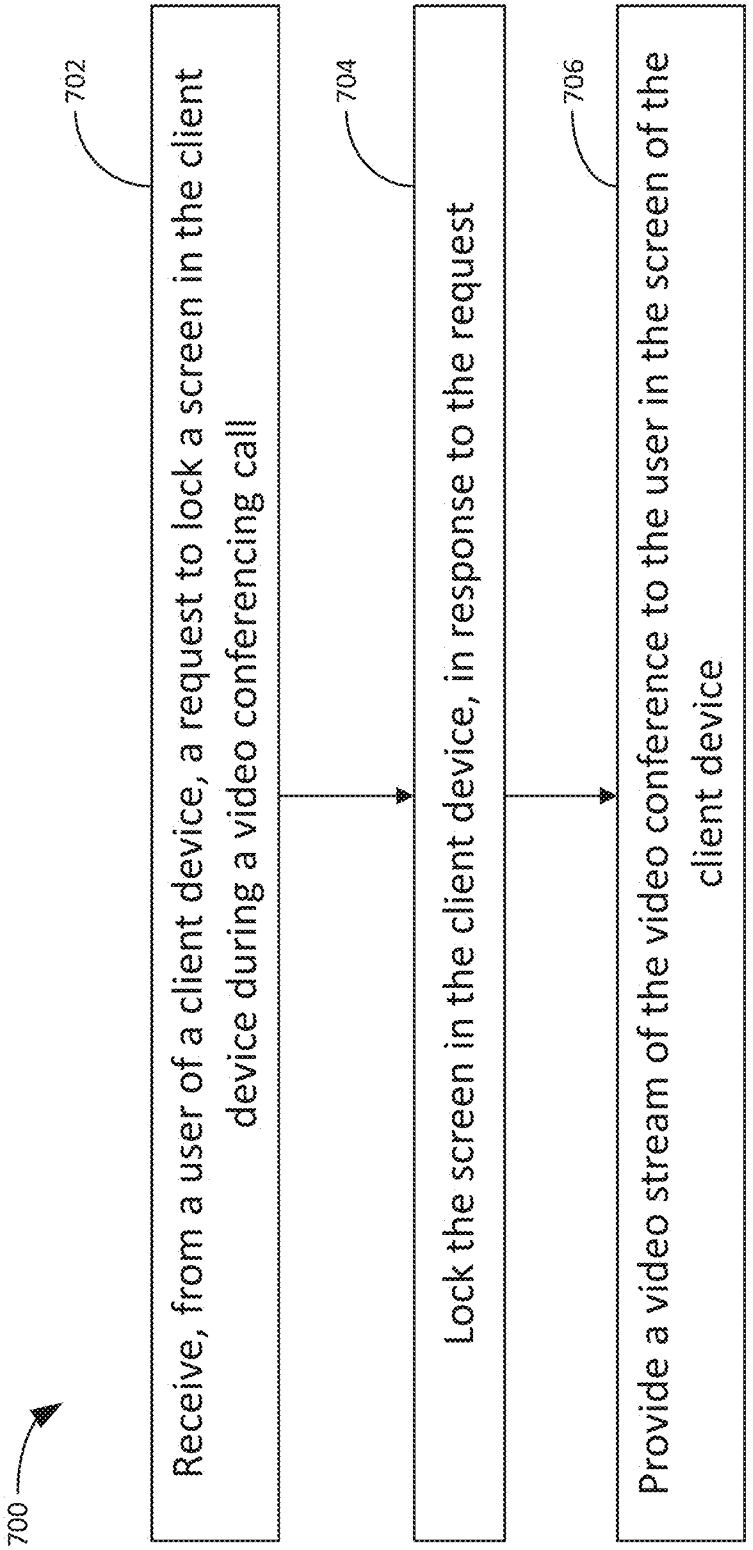
FIG. 7 is a flowchart illustrating steps in a method for locking a screen of a client device during a video conference call, according to some embodiments.

FIG. 7 is a flowchart illustrating steps in a method 700 for locking a screen of a client device during a video conference call, according to some embodiments. In some embodiments, one or more steps in method 700 may be performed by a processor circuit executing instructions stored in a memory circuit of a client device, a server, or a database, communicatively coupled to one another via communications modules through a network, as disclosed herein (cf. processors 212, memories 220, communications modules 218, client devices 110 and 210, servers 130 and 230, databases 152 and 252, and network 150). Further, the memories may include a group chat application and a chat engine, each having tools such as a screen locking tool, a screen unlocking tool, or a messaging tool, as disclosed herein (cf. application 222, chat engine 232, messaging tool 240, screen locking tool 242, and screen unlocking tool 244). Moreover, in some embodiments, a method consistent with this disclosure may include at least one or more steps in method 700 performed in a different order, simultaneously, quasi-simultaneously, or overlapping in time.

Step 702 includes receiving, from a user of a client device, a request to lock a screen in the client device during a video conference call. In some embodiments, step 702 includes displaying on the screen of the client device, an icon indicative that the screen of the client device is locked.

Step 704 includes locking the screen in the client device, in response to the request. In some embodiments, step 704 includes receiving, from the user of the client device, a request to unlock the screen, and unlocking the screen when the user has solved a puzzle. In some embodiments, step 704 includes receiving, from the user of the client device, an input requesting to unlock the screen in the client device, providing, in the screen, a puzzle for the user to solve, and unlocking the screen in the client device upon receipt of a correct response to the puzzle, from the user. In some embodiments, step 704 includes selecting the puzzle cyclically from multiple puzzles stored in a memory. In some embodiments, step 704 includes updating a memory including multiple puzzles for unlocking the screen of the client device with a new puzzle. In some embodiments, the puzzle includes one of a mathematical problem, a geometrical problem, a user fingerprint, or a user biomarker. In some embodiments, step 704 includes maintaining a state of the client device and one or more accessories prior to receiving the request from the user of the client device. In some embodiments, step 704 includes preventing an inclusion of a new participant in the video conference call before the screen is unlocked. In some embodiments, step 704 includes preventing the user from leaving the video conference before the screen is unlocked.

Step 706 includes providing a video stream of the video conference to the user in the screen of the client device.

Figure 8:
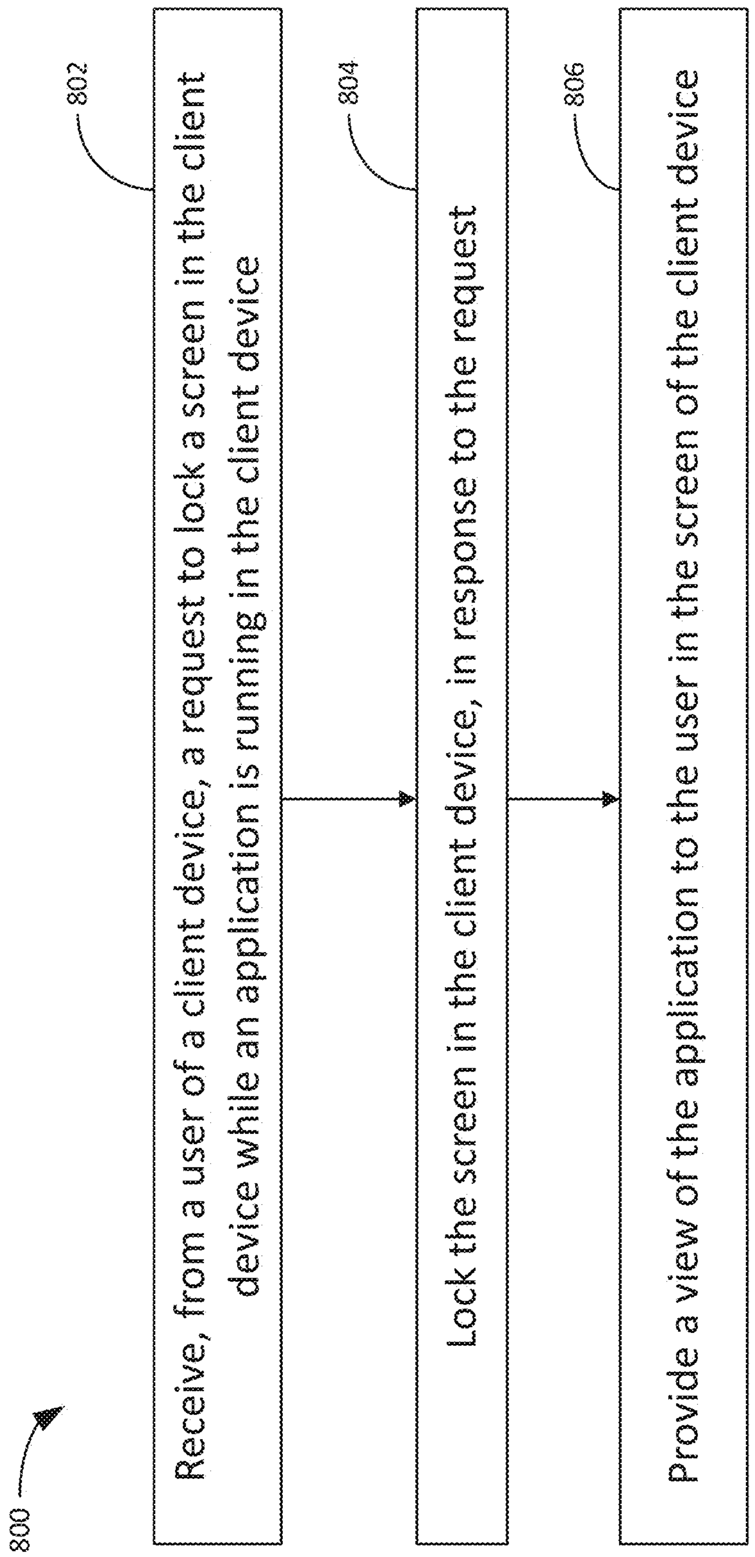
FIG. 8 is a flow chart illustrating steps in a method for locking a screen of a client device while running an application, according to some embodiments.

FIG. 8 is a flow chart illustrating steps in a method 800 for locking a screen of a client device while running an application, according to some embodiments. In some embodiments, one or more steps in method 800 may be performed by a processor circuit executing instructions stored in a memory circuit of a client device, a server, or a database, communicatively coupled to one another via communications modules through a network, as disclosed herein (cf. processors 212, memories 220, communications modules 218, client devices 110 and 210, servers 130 and 230, databases 152 and 252, and network 150). Further, the memories may include a group chat application and a chat engine, each having tools such as a screen locking tool, a screen unlocking tool, or a messaging tool, as disclosed herein (cf. application 222, chat engine 232, messaging tool 240, screen locking tool 242, and screen unlocking tool 244). Moreover, in some embodiments, a method consistent with this disclosure may include at least one or more steps in method 800 performed in a different order, simultaneously, quasi-simultaneously, or overlapping in time.

Step 802 includes receiving, from a user of a client device, a request to lock a screen in the client device while an application is running in the client device. In some embodiments, the application is native to the client device, and step 802 includes allowing the application to run until after the user has unlocked the screen in the client device. In some embodiments, the application is hosted by a remote server, and step 802 includes allowing the remote server to record an output of the application.

Step 804 includes locking the screen in the client device, in response to the request. In some embodiments, step 804 includes blocking a touch input to the client device. In some embodiments, step 804 includes displaying on the screen of the client device, an icon indicative that the screen of the client device is locked. In some embodiments, step 804 further includes receiving, from the user of the client device, a request to unlock the screen, and unlocking the screen when the user has solved a puzzle. In some embodiments, step 804 further includes providing, in the screen, the puzzle for the user to solve. In some embodiments, the puzzle is selected cyclically from multiple puzzles stored in a memory.

Step 806 includes providing a view of the application to the user in the screen of the client device. In some embodiments, step 806 further includes updating a memory including multiple puzzles for unlocking the screen of the client device with a new puzzle. In some embodiments, step 806 further includes providing a puzzle to the user to unlock the screen in the client device, wherein the puzzle includes one of a mathematical problem, a geometrical problem, a user fingerprint, or a user biomarker.

Hardware Overview

Figure 9:
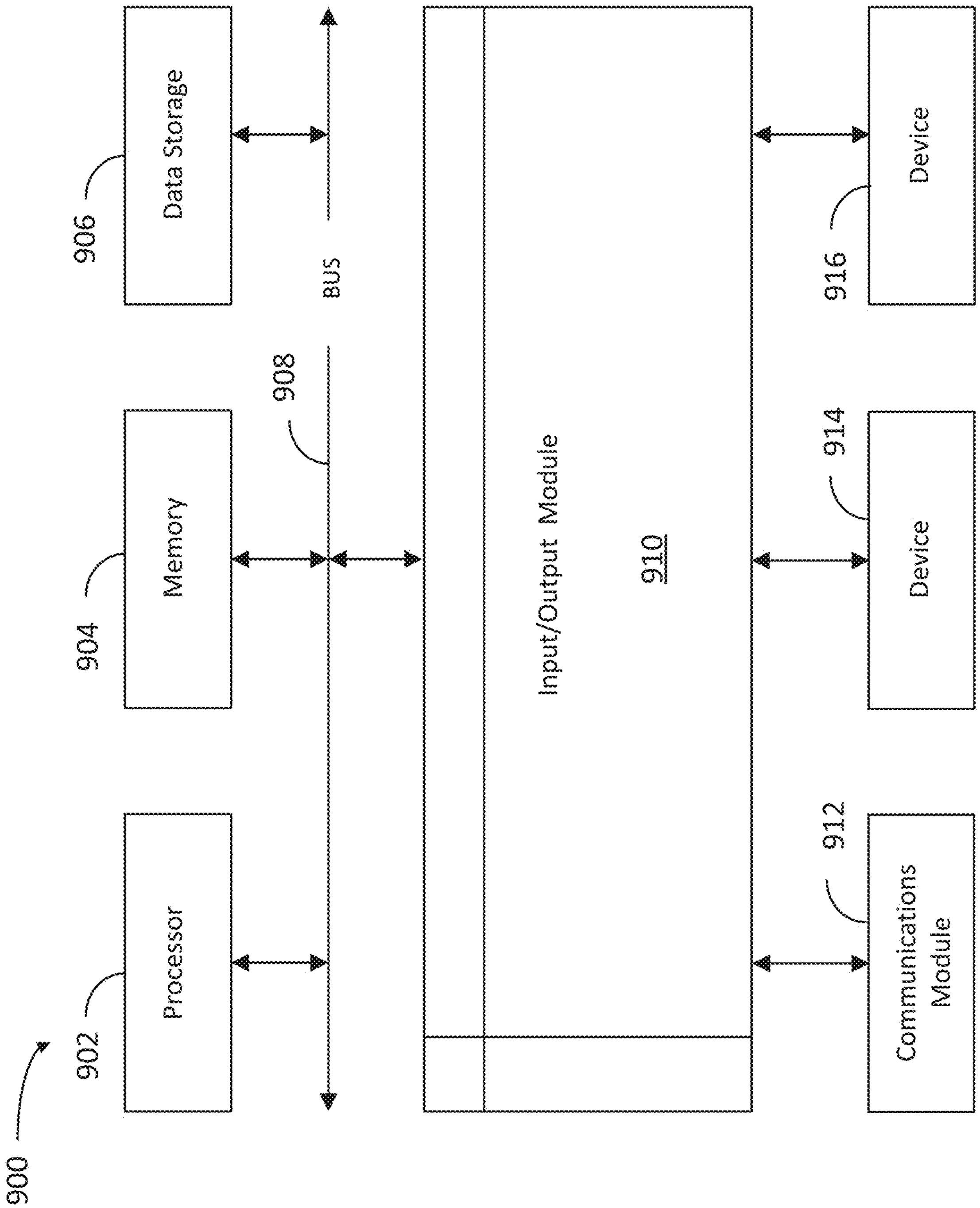
FIG. 9 is a block diagram illustrating an exemplary computer system with which headsets and other client devices, and the methods in FIGS. 7 and 8 can be implemented, according to some embodiments.

FIG. 9 is a block diagram illustrating an exemplary computer system 900 with which headsets and other client devices 110, and methods 700 and 800 can be implemented, according to some embodiments. In certain aspects, computer system 900 may be implemented using hardware or a combination of software and hardware, either in a dedicated server, or integrated into another entity, or distributed across multiple entities. Computer system 900 may include a desktop computer, a laptop computer, a tablet, a phablet, a smartphone, a feature phone, a server computer, or otherwise. A server computer may be located remotely in a data center or be stored locally.

Computer system 900 includes a bus 908 or other communication mechanism for communicating information, and a processor 902 (e.g., processors 212) coupled with bus 908 for processing information. By way of example, the computer system 900 may be implemented with one or more processors 902. Processor 902 may be a general-purpose microprocessor, a microcontroller, a Digital Signal Processor (DSP), an Application Specific Integrated Circuit (ASIC), a Field Programmable Gate Array (FPGA), a Programmable Logic Device (PLD), a controller, a state machine, gated logic, discrete hardware components, or any other suitable entity that can perform calculations or other manipulations of information.

Computer system 900 can include, in addition to hardware, code that creates an execution environment for the computer program in question, e.g., code that constitutes processor firmware, a protocol stack, a database management system, an operating system, or a combination of one or more of them stored in an included memory 904 (e.g., memories 220), such as a Random Access Memory (RAM), a flash memory, a Read-Only Memory (ROM), a Programmable Read-Only Memory (PROM), an Erasable PROM (EPROM), registers, a hard disk, a removable disk, a CD-ROM, a DVD, or any other suitable storage device, coupled with bus 908 for storing information and instructions to be executed by processor 902. The processor 902 and the memory 904 can be supplemented by, or incorporated in, special purpose logic circuitry.

The instructions may be stored in the memory 904 and implemented in one or more computer program products, e.g., one or more modules of computer program instructions encoded on a computer-readable medium for execution by, or to control the operation of, the computer system 900, and according to any method well known to those of skill in the art, including, but not limited to, computer languages such as data-oriented languages (e.g., SQL, dBase), system languages (e.g., C, Objective-C, C++, Assembly), architectural languages (e.g., Java, .NET), and application languages (e.g., PHP, Ruby, Perl, Python). Instructions may also be implemented in computer languages such as array languages, aspect-oriented languages, assembly languages, authoring languages, command line interface languages, compiled languages, concurrent languages, curly-bracket languages, dataflow languages, data-structured languages, declarative languages, esoteric languages, extension languages, fourth-generation languages, functional languages, interactive mode languages, interpreted languages, iterative languages, list-based languages, little languages, logic-based languages, machine languages, macro languages, metaprogramming languages, multiparadigm languages, numerical analysis, non-English-based languages, object-oriented class-based languages, object-oriented prototype-based languages, off-side rule languages, procedural languages, reflective languages, rule-based languages, scripting languages, stack-based languages, synchronous languages, syntax handling languages, visual languages, wirth languages, and xml-based languages. Memory 904 may also be used for storing temporary variable or other intermediate information during execution of instructions to be executed by processor 902.

A computer program as discussed herein does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network. The processes and logic flows described in this specification can be performed by one or more programmable processors executing one or more computer programs to perform functions by operating on input data and generating output.

Computer system 900 further includes a data storage device 906 such as a magnetic disk or optical disk, coupled with bus 908 for storing information and instructions. Computer system 900 may be coupled via input/output module 910 to various devices. Input/output module 910 can be any input/output module. Exemplary input/output modules 910 include data ports such as USB ports. The input/output module 910 is configured to connect to a communications module 912. Exemplary communications modules 912 include networking interface cards, such as Ethernet cards and modems. In certain aspects, input/output module 910 is configured to connect to a plurality of devices, such as an input device 914 and/or an output device 916. Exemplary input devices 914 include a keyboard and a pointing device, e.g., a mouse or a trackball, by which a consumer can provide input to the computer system 900. Other kinds of input devices 914 can be used to provide for interaction with a consumer as well, such as a tactile input device, visual input device, audio input device, or brain-computer interface device. For example, feedback provided to the consumer can be any form of sensory feedback, e.g., visual feedback, auditory feedback, or tactile feedback; and input from the consumer can be received in any form, including acoustic, speech, tactile, or brain wave input. Exemplary output devices 916 include display devices, such as an LCD (liquid crystal display) monitor, for displaying information to the consumer.

According to one aspect of the present disclosure, headsets and client devices 110 can be implemented, at least partially, using a computer system 900 in response to processor 902 executing one or more sequences of one or more instructions contained in memory 904. Such instructions may be read into memory 904 from another machine-readable medium, such as data storage device 906. Execution of the sequences of instructions contained in main memory 904 causes processor 902 to perform the process steps described herein. One or more processors in a multi-processing arrangement may also be employed to execute the sequences of instructions contained in memory 904. In alternative aspects, hard-wired circuitry may be used in place of or in combination with software instructions to implement various aspects of the present disclosure. Thus, aspects of the present disclosure are not limited to any specific combination of hardware circuitry and software.

Various aspects of the subject matter described in this specification can be implemented in a computing system that includes a back end component, e.g., a data server, or that includes a middleware component, e.g., an application server, or that includes a front end component, e.g., a client computer having a graphical consumer interface or a Web browser through which a consumer can interact with an implementation of the subject matter described in this specification, or any combination of one or more such back end, middleware, or front end components. The components of the system can be interconnected by any form or medium of digital data communication, e.g., a communication network.

The communication network can include, for example, any one or more of a LAN, a WAN, the Internet, and the like. Further, the communication network can include, but is not limited to, for example, any one or more of the following network topologies, including a bus network, a star network, a ring network, a mesh network, a star-bus network, tree or hierarchical network, or the like. The communications modules can be, for example, modems or Ethernet cards.

Computer system 900 can include clients and servers. A client and server are generally remote from each other and typically interact through a communication network. The relationship of client and server arises by virtue of computer programs running on the respective computers and having a client-server relationship to each other. Computer system 900 can be, for example, and without limitation, a desktop computer, laptop computer, or tablet computer. Computer system 900 can also be embedded in another device, for example, and without limitation, a mobile telephone, a PDA, a mobile audio player, a Global Positioning System (GPS) receiver, a video game console, and/or a television set top box.

The term "machine-readable storage medium" or "computer-readable medium" as used herein refers to any medium or media that participates in providing instructions to processor 902 for execution. Such a medium may take many forms, including, but not limited to, non-volatile media, volatile media, and transmission media. Non-volatile media include, for example, optical or magnetic disks, such as data storage device 906. Volatile media include dynamic memory, such as memory 904. Transmission media include coaxial cables, copper wire, and fiber optics, including the wires forming bus 908. Common forms of machine-readable media include, for example, floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH EPROM, any other memory chip or cartridge, or any other medium from which a computer can read. The machine-readable storage medium can be a machine-readable storage device, a machine-readable storage substrate, a memory device, a composition of matter affecting a machine-readable propagated signal, or a combination of one or more of them.

To illustrate the interchangeability of hardware and software, items such as the various illustrative blocks, modules, components, methods, operations, instructions, and algorithms have been described generally in terms of their functionality. Whether such functionality is implemented as hardware, software, or a combination of hardware and software depends upon the particular application and design constraints imposed on the overall system. Skilled artisans may implement the described functionality in varying ways for each particular application.

As used herein, the phrase "at least one of" preceding a series of items, with the terms "and" or "or" to separate any of the items, modifies the list as a whole, rather than each member of the list (i.e., each item). The phrase "at least one of" does not require selection of at least one item; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

To the extent that the term "include," "have," or the like is used in the description or the claims, such term is intended to be inclusive in a manner similar to the term "include" as "include" is interpreted when employed as a transitional word in a claim. The word "exemplary" is used herein to mean "serving as an example, instance, or illustration." Any embodiment described herein as "exemplary" is not necessarily to be construed as preferred or advantageous over other embodiments.

A reference to an element in the singular is not intended to mean "one and only one" unless specifically stated, but rather "one or more." All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description. No claim element is to be construed under the provisions of 35 U.S.C. § 112, sixth paragraph, unless the element is expressly recited using the phrase "means for" or, in the case of a method claim, the element is recited using the phrase "step for."

While this specification contains many specifics, these should not be construed as limitations on the scope of what may be claimed, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

The subject matter of this specification has been described in terms of particular aspects, but other aspects can be implemented and are within the scope of the following claims. For example, while operations are depicted in the drawings in a particular order, this should not be understood as requiring that such operations be performed in the particular order shown or in sequential order, or that all illustrated operations be performed, to achieve desirable results. The actions recited in the claims can be performed in a different order and still achieve desirable results. As one example, the processes depicted in the accompanying figures do not necessarily require the particular order shown, or sequential order, to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products. Other variations are within the scope of the following claims.

The title, background, brief description of the drawings, abstract, and drawings are hereby incorporated into the disclosure and are provided as illustrative examples of the disclosure, not as restrictive descriptions. It is submitted with the understanding that they will not be used to limit the scope or meaning of the claims. In addition, in the detailed description, it can be seen that the description provides illustrative examples and the various features are grouped together in various implementations for the purpose of streamlining the disclosure. The method of disclosure is not to be interpreted as reflecting an intention that the described subject matter requires more features than are expressly recited in each claim. Rather, as the claims reflect, inventive subject matter lies in less than all features of a single disclosed configuration or operation. The claims are hereby incorporated into the detailed description, with each claim standing on its own as a separately described subject matter.

The claims are not intended to be limited to the aspects described herein, but are to be accorded the full scope consistent with the language claims and to encompass all legal equivalents. Notwithstanding, none of the claims are intended to embrace subject matter that fails to satisfy the requirements of the applicable patent law, nor should they be interpreted in such a way.

What is claimed is:

1. A computer-implemented method, comprising:

receiving, by an interactive element of a screen of a client device, a first request of a user to prevent processing of inputs received at one or more user interface controls displayed in at least a portion of the screen in the client device during a video conference call, wherein the interactive element remains visible and functional on the screen during the video conference call;

in response to the first request, causing the client device to prevent processing of inputs received at one or more user interface controls displayed in a first portion of the screen including the video conference call while the video conference call continues to be displayed, wherein preventing processing of inputs includes preventing an inclusion of a new participant in the video conference call before the first portion of the screen is unlocked;

continuing to allow processing of inputs received at a second portion of the screen including the interactive element, wherein the interactive element is configured to receive, at the second portion of the screen, a second request to re-enable processing of inputs received at the one or more user interface controls displayed in the first portion of the screen; and in response to receiving the second request, presenting a prompt to the user and re-enabling processing of inputs at the first portion upon validating a user response to the prompt, wherein the prompt comprises at least one of: a puzzle, a mathematical problem, a user fingerprint, or a user biomarker.

2. The computer-implemented method of claim 1, further comprising displaying on the screen of the client device, an icon indicative that processing of inputs is prevented to the first portion of the screen of the client device, the icon including the interactive element.

3. The computer-implemented method of claim 1, further comprising receiving, from the user of the client device, the second request to re-enable processing of inputs at the first portion of the screen, and re-enabling processing of inputs at the first portion of the screen when the user has solved a puzzle.

4. The computer-implemented method of claim 1, further comprising receiving, from the user of the client device, an input requesting to re-enable processing of inputs at the first portion of the screen in the client device, providing, in the screen, a puzzle for the user to solve as an overlay on the video conference call, and re-enabling processing of inputs at the first portion of the screen in the client device upon receipt of a correct response to the puzzle.

5. The computer-implemented method of claim 1, further comprising receiving, from the user of the client device, an input requesting to re-enable processing of inputs at the first portion of the screen in the client device, and providing, in the screen, a puzzle for the user to solve, wherein the puzzle is selected cyclically from multiple puzzles stored in a memory.

6. The computer-implemented method of claim 1, further comprising updating a memory including multiple puzzles for re-enabling processing of inputs at the first portion of the screen of the client device with a new puzzle.

7. The computer-implemented method of claim 1, further comprising providing a puzzle to the user to re-enable processing of inputs at the first portion of the screen in the client device.

8. The computer-implemented method of claim 1, wherein preventing processing of inputs at the first portion of the screen comprises maintaining a state of the client device and one or more accessories prior to receiving the first request from the user of the client device.

9. The computer-implemented method of claim 1, wherein preventing processing of inputs at the first portion of the screen comprises preventing the user from closing or exiting the video conference call before the screen is unlocked.

10. A computer-implemented method, comprising:

receiving, by an interactive element of a screen of a client device, a first request of a user to prevent processing of inputs received at one or more user interface controls displayed in a first portion of the screen in the client device while an application is running on the client device, wherein the interactive element remains visible and functional on the screen while the application is running;

in response to the first request, causing the client device to prevent processing of inputs received at one or more user interface controls displayed in the first portion of the screen including the application while the application continues to run, wherein preventing processing of inputs comprises restricting addition of additional participants in the application prior to the first portion of the screen being unlocked;

continuing to allow processing of inputs received at a second portion of the screen including the interactive element, wherein the interactive element is configured to receive, at the second portion of the screen, a second request to re-enable processing of inputs received at the one or more user interface controls displayed in the first portion of the screen; and in response to receiving the second request, presenting a prompt to the user and re-enabling processing of inputs at the first portion upon validating a user response to the prompt, wherein the prompt comprises at least one of: a puzzle, a mathematical problem, a user fingerprint, or a user biomarker.

11. The computer-implemented method of claim 10, wherein the application is native to the client device, further comprising allowing the application to run until after processing of inputs are re-enabled on the first portion the screen in the client device.

12. The computer-implemented method of claim 10, wherein the application is hosted by a remote server, further comprising allowing the remote server to record an output of the application.

13. The computer-implemented method of claim 10, wherein preventing processing of inputs at the first portion of the screen in the client device comprises blocking a touch input to the client device.

14. The computer-implemented method of claim 10, further comprising displaying on the screen of the client device, an icon indicative that processing of inputs is prevented at the first portion of the screen of the client device, the icon including the interactive element.

15. The computer-implemented method of claim 10, further comprising receiving, from the user of the client device, the second request to re-enable processing of inputs at the first portion of the screen, and re-enabling processing of inputs at the first portion of the screen when the user has solved a puzzle.

16. The computer-implemented method of claim 10, further comprising receiving, from the user of the client device, an input requesting to re-enable processing of inputs at the first portion of the screen in the client device, providing, in the screen, a puzzle for the user to solve, and re-enabling processing of inputs at the first portion of the screen in the client device upon receipt of a correct response to the puzzle, from the user.

17. The computer-implemented method of claim 10, further comprising receiving, from the user of the client device, an input requesting to re-enable processing of inputs at the first portion of the screen in the client device, and providing, in the screen, a puzzle for the user to solve, wherein the puzzle is selected cyclically from multiple puzzles stored in a memory.

18. The computer-implemented method of claim 10, further comprising updating a memory including multiple puzzles for re-enabling processing of inputs at the first portion of the screen of the client device with a new puzzle.

19. The computer-implemented method of claim 10, further comprising providing a puzzle to the user to re-enable processing of inputs at the first portion of the screen in the client device.

* * * * *